United States Patent Office 3,509,082
Patented Apr. 28, 1970

3,509,082
TITANIUM DIOXIDE PIGMENTED PAINTS EXTENDED WITH SYNTHETIC SODIUM ALUMINO SILICATE PIGMENT
Robert K. Mays, Havre de Grace, Md., assignor to J. M. Huber Corporation, Locust, N.J., a corporation of New Jersey
No Drawing. Continuation of application Ser. No. 359,457, Apr. 13, 1964, which is a continuation-in-part of application Ser. No. 113,600, May 31, 1961. This application Oct. 7, 1968, Ser. No. 784,974
Int. Cl. C08f 45/04
U.S. Cl. 260—22          3 Claims

ABSTRACT OF THE DISCLOSURE

Titanium dioxide pigmented paint compositions are extended by replacing from 10% to 40% by weight of the titanium dioxide from a finely divided synthetic, amorphous sodium alumino silicate pigment.

---

This application is a continuation-in-part of U.S. application Ser. No. 113,600, filed May 31, 1961, entitled "Paint," and now abandoned.

This invention relates to paint compositions containing pigments composed of a mixture of titanium dioxide and finely divided, synthetic, amorphous, sodium alumino silicates of submicron particle size.

More particularly this invention relates to latex emulsion paints and alkyd flat paints containing a pigment composed of a mixture of titanium dioxide and finely divided, synthetic, amorphous, sodium alumino silicates of submicron particle size.

Both latex or water-emulsion paints and alkyd flat paints for both interior and exterior applications are widely used. The latex emulsion paints are used because they are safe, odorless, very fast drying, easy to apply and, when spilled, are easily removed from clothes, brushes and floors by washing with water.

The alkyd flat paints are used because they have good appearance, hiding power, and levelling.

The paint latices used in the water-emuslion paint formulations are copolymers which are produced from two or more unsaturated polymerizable components in the presence of surface active agents acting as stabilizers, and one or more per compounds acting as polymerization accelerators, to form an aqueous emulsion polymer system. The unsaturated compounds used, for example, are styrene, butadiene, vinyl acetate, acrylates such as methyl methacrylate, ethyl acrylate, and acrylonitrile, vinyl chloride, vinyl butyrate, vinyl toluene, isoprene and the like. Among useful paint latices are copolymers and terpolymers comprising monovinyl aromatic hydrocarbons containing a single reactive center of polymerization, and aliphatic conjugated diolefins. As a class, the water emulsion or latex paints are well known to the art. Included in the preferred types of water emulsion paints useful in the present invention are styrene-butadiene, polyvinyl acetate (PVAc), and acrylic resin paints. Representative acrylic resin emulsions are disclosed in "Rhoplex AC–33 for Exterior Paints," 6th annual progress report by Rohm and Haas Company (October 1959).

Alkyd resins are the complexes resulting from the reaction of polyhydric alcohols and resinifying carboxylic organic acids such as polybasic acids and their anhydrides.

Today two major groups of alkyd resins are widely used in paints and varnishes, the phthalic alkyd resins, and the maleic alkyd resins. The former comprises all alkyd resins made with phthalic acid or anhydride as the major polybasic acid reactant. It includes those modifications in which maleic acid or another polybasic acid constituent has been substituted in minor proportions for phthalic acid.

The latter group comprises resins based on maleic anhydride or acids derived from maleic anhydride by the Diels-Alder or other addition reactions. All the primary polybasic acids used in preparing these resins contain an unsaturated hydrocarbon group. This class includes resins manufactured from fumaric acid, the trans isomer of maleic acid.

Although the basic reactions involved in the preparation of alkyd resins are simple, the chemistry of the whole is complex when all the ramifications are considered.

All the resins of the phthalic type are modifications of glycerol phthalate. Other polyhydric alcohols such as ethylene, diethylene, and triethylene glycols, sorbitol, mannitol, and pentaerythritol are also used.

Agents known as modifying agents are used to partially esterify the polyhydric alcohol before reaction with the phthalic or maleic acid or anhydride. The type and degree of modification plays a susbtantial part in the final properties of the resin.

Phthalic alkyd resins are made with modifiers such as maleic anhydride, fumaric acid, succinic acid, adipic acid, sebacic acid, citric acid, malic acid, tartaric acid, diphenic acid and 1,8 naphthalic acid. The leading modifiers particularly useful in coating compositions and paints are fatty acids and their glycerol esters as well as the well-known drying oils and their fatty acids. Examples are soybean, linseed, perilla, sunflower, fish, oiticica, tung, tall, and dehydrated castor oils. Non-drying oils such as cottonseed, castor, and coconut oils are also used.

Some derivatives of the foregoing are also used.

Alkyd paints are divided into three types, i.e., long-oil alkyds which contain from 64 to 70% of oil to 28 to 23% phthalic anhydride, medium-oil alkyds which contain from 53 to 61% oil to 36 to 30% phthalic anhydride, short-oil alkyds having 42 to 50% oil to 45 to 39% phthalic anhydride. The oil length determines such important properties as rate of drying, solubility, compatibility, and durability.

The medium- and long-oil alkyds are most widely used in brushing formulations of the air-drying types. The short-oil resins are the bake dry types.

The maleic alkyd resins are also useful in paints with properties similar to the comparable phthalic resins.

In formulating both the water-emulsion paints and the alkyd resin flat paints its is necessary to incorporate a pigment which will impart to the paint desirable optical properties such as hiding power or opacity, brightness, and reflectance. The pigment additives affect other properties of the paint and this must be taken into consideration when selecting a pigment. The properties of paints affected by pigment additives are viscosity, viscosity stability, washability, scuff resistance, scrub resistance, stain removal, adhesion, flex, gloss, settling, freeze-thaw stability and enamel holdout.

The pigment in use today which is most suitable for beneficially affecting the above desirable properties in alkyd flat paints and water-emulsion paints is titanium dioxide. This pigment, however, is a relatively expensive paint pigment and it is difficult to prevent it from reagglomerating after grinding. The paint industry, therefore, has been faced with the problem of finding an inexpensive pigment for use in water-emulsion and alkyd flat paints which will either totally or partially replace titanium dioxide and not adversely affect the properties of the paint. The extenders in use today such as the calcined clays, calcium carbonate, magnesium silicate, diatomaceous silicas and their reaction products, e.g., synthetic calcium silicates, are not completely satisfactory since they tend to reduce the optical properties of the titanium dioxide.

I have discovered a relatively inexpensive pigment useful as a titanium dioxide extender in both water-emulsion paints and alkyd resin flat paints which not only maintains the optical properties of the paints containing the extended pigments, but also improves them without adversely affecting the other paint properties previously listed. Chemically, the pigment is a finely divided sodium alumino silicate of submicron particle size and has a pH of 6.5 to 10.5. Pigments of this type are disclosed in U.S. Patents 2,739,073 and 2,848,346 and as disclosed in these patents, the sodium alumino silicate pigments have 0.8 to 1.3 moles of $Na_2O$ per mole of $Al_2O_3$ and at least 4 moles of $SiO_2$ per mole of $Na_2O$.

It is an object of this invention to provide water-emulsion paints and alkyd resin flat paints of superior optical properties containing titanium dioxide extended with relatively inexpensive sodium alumino silicate pigments.

A further object of this invention is to provide water-emulsion paints and alkyd resin flat paints containing titanium dioxide extended with sodium alumino silicate pigments which exhibit optical properties superior to those paints containing unextended titanium dioxide.

A still further object of this invention is to provide water-emulsion paints and alkyd resin flat paints containing highly dispersed pigments comprising titanium dioxide, and finely divided sodium alumino silicate.

Another object of this invention is to provide water-emulsion paints of improved viscosity stability containing titanium dioxide extended with sodium alumino silicate pigments.

Another further object of ths invention is to provide alkyd resin flat paints of improved flatness properties containing titanium dioxide extended with sodium alumino silicate pigments.

A still further object of this invention is to provide alkyd resin flat paints of accelerated drying time containing titanium dioxide extended with sodium alumino silicate pigments.

Other advantages and objects will be apparent from the following specification.

The utilization of sodium alumino silicate pigments to extend the titanium dioxide pigment in both water-emulsion paints and alkyd resin flat paints results in a paint with optical properties, particularly hiding power, superior to those obtained when other extender pigments are used. The hiding power, as measured by the contrast ratio of the paints containing titanium dioxide extended with sodium alumino silicate pigments, is superior to that obtained in paints containing other extenders used with titanium dioxide. Furthermore, when sodium alumino silicate pigments are used to extend titanium dioxide pigments in paints, a synergism is effected on the hiding power or opacity of the titanium dioxide when up to 40% of the weight of the titanium dioxide is replaced by sodium alumino silicate on either an equal weight or a volume basis.

Table I illustrates the superiority of sodium alumino silicate pigments over the conventional titanium dioxide extender, diatomaceous silica, in a PVAc emulsion paint.

TABLE I.—POLYVINYL ACETATE EMULSION PAINT

[Ball mill grind]

| | Control | Sodium alumino silicate extended |
|---|---|---|
| Formula: | | |
| Titanium (rutile), parts by weight | 175 | 175 |
| Diatomaceous silica, parts by weight | 50 | |
| Sodium alumino silicate, parts by weight | | 50 |
| Kaolin clay, parts by weight | 200 | 200 |
| Whiting, parts by weight | 100 | 100 |
| PVAc emulsion (55%), parts by weight | 175 | 175 |
| Total pounds/100 gallons | 1,190 | 1,190 |
| Pigment volume concentration, percent | 65 | 65 |
| Test data: | | |
| Black reflectance, percent | 86.45 | 91.0 |
| White reflectance, percent | 90.40 | 92.1 |
| Contrast ratio | 0.957 | 0.988 |
| Density, pounds/gallon | 11.90 | 11.88 |
| Viscosity, K.U.: | | |
| 1 month | 84 | 78 |
| 2 months | 84 | 78 |
| 3 months | 84 | 78 |
| Freeze-thaw stability, 5 cycles | OK | OK |
| Gloss, percent 60° specular | 12 | 12 |
| Dryset, minutes | 90 | 90 |
| Washability | | Equal |
| Scuff resistance | | Equal |
| Scrubability | | Equal |
| Flexing | | Equal |
| Enamel holdout | | Equal |
| Settling | | Equal |

The data in Table I indicate that when diatomaceous silicate is used as an extender for titanium dioxide the paint exhibits a contrast ratio of 0.957. When sodium alumino silicate replaces all the conventional extender, the contrast ratio increases to 0.988. As discussed in Gardner et al., Physical and Chemical Examination of Paints, Varnishes, Lacquers and Colors, Eleventh Edition, 1950, Chapter 1, the closer to 1.0 the contrast ratio is, the greater the hiding power of the paint. Hiding power is a measure of the opacity of a paint and its capacity to obliterate the substrate upon which it is spread. As stated by Gardner et al., page 10, complete hiding is reached when the contrast ratio is 0.98. From the data in Table I, it is thus apparent that, when sodium alumino silicate is used as an extender of titanium dioxide in PVAc water-emulsion paints, substantially complete hiding power is attained where a conventional titanium dioxide extender is deficient in this respect.

Table I also indicates that sodium alumino silicate, when used as an extender for titanium dioxide in place of a conventional extender in PVAc water-emulsion paints, does not sacrifice the other important properties of the paint at the expense of superior hiding power.

The following tables illustrate the effects of sodium alumino silicate pigments used as an extender for titanium dioxide in various water-emulsion and alkyd resin flat paint formulations.

TABLE II.—POLYVINYL ACETATE EMULSION PAINT

[Ball mill grind]

| | Control | Sodium alumino silicate | | | |
|---|---|---|---|---|---|
| Percent TiO₂ replacement, weight basis | 0 | 10 | 20 | 30 | 40 |
| Formula: | | | | | |
| Titanium (rutile) | 175 | 157.5 | 140 | 122.5 | 105 |
| Sodium alumino silicate | 0 | 17.5 | 35 | 52.5 | 70 |
| Diatomaceous silica | 50 | 50 | 50 | 50 | 50 |
| Kaolin clay | 200 | 200 | 200 | 200 | 200 |
| Whiting | 100 | 100 | 100 | 100 | 100 |
| PVAc emulsion (55%) | 175 | 175 | 175 | 175 | 175 |
| Total pounds/gallon | 1,109 | | | | |
| Density, pounds/gallon | 11.9 | 11.84 | 11.78 | 11.72 | 11.66 |
| PVC, percent | 65 | | | | 66.5 |
| Cost savings/100 gallons, percent | 0 | 4.96 | 9.92 | 14.88 | 19.84 |
| Optical data: | | | | | |
| Black reflectance, percent | 86.4 | 87.9 | 86.7 | 86.0 | 83.6 |
| White reflectance, percent | 90.4 | 91.8 | 90.6 | 90.0 | 89.2 |
| Contrast ratio | 0.957 | 0.958 | 0.958 | 0.956 | 0.938 |

TABLE III.—STYRENE-BUTADIENE LATEX PAINT
[Ball mill grind]

| Percent TiO₂ replacement, weight basis | Control | Sodium alumino silicate | | | |
|---|---|---|---|---|---|
| | 0 | 10 | 20 | 30 | 40 |
| Formula: | | | | | |
| Titanium (rutile) | 165 | 148.5 | 132 | 115.5 | 99 |
| Sodium alumino silicate | 0 | 16.5 | 33 | 49.5 | 66 |
| Diatomaceous silica | 47 | 47 | 47 | 47 | 47 |
| Kaolin clay | 188 | 188 | 188 | 188 | 188 |
| Whiting | 94 | 94 | 94 | 94 | 94 |
| Styrene-butadiene emulsion (48%) | 194 | 197 | 197 | 197 | 197 |
| Total pounds/100 gallons | 1,163 | | | | |
| Density, pounds/gallon | 11.62 | 11.57 | 11.52 | 11.47 | 11.42 |
| PVC, percent | 60 | | | | 62 |
| Cost savings/100 gallons, percent | 0 | 5.09 | 10.17 | 15.26 | 20.34 |
| Optical data: | | | | | |
| Black reflectance, percent | 78 | 79.55 | 80.90 | 81.60 | 80.6 |
| White reflectance, percent | 87.8 | 88.30 | 88.90 | 89.30 | 89.20 |
| Contrast ratio | 0.888 | 0.900 | 0.911 | 0.914 | 0.903 |

TABLE IV.—ACRYLIC EMULSION PAINT [1]

| Percent TiO₂ replacement, weight basis | Control | Sodium alumino silicate | | | |
|---|---|---|---|---|---|
| | 0 | 10 | 20 | 30 | 40 |
| Black reflectance, percent | 74 | 75.2 | 76.3 | 77.8 | 76.1 |
| White reflectance, percent | 87.2 | 87.2 | 87.2 | 87.1 | 86.7 |
| Contrast ratio | 0.853 | 0.861 | 0.872 | 0.892 | 0.877 |
| TiO₂, pounds | 350 | 315 | 280 | 245 | 210 |
| Sodium alumino silicate, pounds | 0 | 35 | 70 | 105 | 140 |
| Savings, percent/100 gallons | 0 | 4.83 | 9.67 | 14.50 | 19.34 |

[1] Rhoplex AC-33, an emulsion of a 100% acrylic ester polymer for water based paints manufactured by Rohm and Haas Company of Philadelphia, Pennsylvania, the exact composition of which is unknown.

The data indicate that when as little as 5% titanium dioxide is replaced in alkyd flats and as little as 10% is replaced in water-emusion paints by sodium alumino silicate, the hiding power of the paint is not sacrificed and in some cases increases with a significant decrease in the cost of the raw materials. This is a result of the better utilization of the titanium dioxide, caused by the smaller sodium alumino silicate particles. The sodium alumino silicate effects a more efficient dispersion of the titanium dioxide pigments, thereby enhancing the optical qualities of the prime pigment. The contrast ratio in Table V diminishes somewhat but this loss is much smaller than would be expected from the reduction in the amount of titanium dioxide and its replacement with sodium alumino silicate which imparts very little hiding power to paints. Experiments have shown that when 100% TiO₂ is replaced in alkyd flat paints by sodium alumino silicate the contrast ratio is 0.19. Table V also illustrating the quick drying qualities imparted to the alkyd flats by the use of sodium alumino silicate.

The sodium alumino silicate pigments in combination with titanium dioxide in paints produce optical effects greater than is indicated from a purely additive basis. Tables II, III, IV and V adequately illustrate this feature of the invention in respect to contrast ratio. The synergistic effect of sodium alumino silicate on the optical properties of the water-emulsion paints containing titanium dioxide is apparent from the fact that, when up to 40% of the titanium dioxide is replaced, either on a volume basis or a weight basis the contrast ratio of the paint increases and is greater than at 0% replacement. Generally, at greater than 40% replacement in both alkyd resin flat paints and water-emulsion paints, the optical properties of the paint are diminished to less than at 0% replacement. The optical improvements using sodium alumino silicate pigments are achieved without any adverse effect on other paint properties and with a decrease in the raw material cost of the paint. With the synthetic pigment used in this invention, the properties of viscosity and viscosity stability, washability, scuff resistance, scrubability, adhesion, flexing, gloss, settling, freeze-thaw stability, and enamel holdout are equal to or better than control paints without the addition of the synethic, amorphous, sodium alumino silicate pigments used in this invention. Since these extender pigments cost about half that of titanium dioxide, substantial savings over present formulation raw materials costs can be obtained by using sodium alumino silicate pigments without sacrifice of paint properties.

The following table illustrates the maintenance of optical and other properties of alkyd resin flat paints with various volume replacements of titanium doxide by sodium alumino silicate.

TABLE V.—ALKYD RESIN FLAT PAINT
[Pounds/100 gallons]

| | Control | Sodium alumino silicate | | | |
|---|---|---|---|---|---|
| Percent TiO₂ replacement, (volume basis) | 0 | 5 | 10 | 20 | 40 |
| Formula: | | | | | |
| Wallkyd 0-1956-35 (35% NV) (phthalic anhydride mixed vegetable oil pure drying alkyd) | 400 | 400 | 400 | 400 | 400 |
| TiO₂ | 210.0 | 199.5 | 189.0 | 168.0 | 126.0 |
| Sodium alumino silicate | 0 | 5.25 | 10.5 | 21.0 | 42.0 |
| CaCO₃ | 459.0 | 459.0 | 459.0 | 459.0 | 459.0 |
| Silica | 56.1 | 56.1 | 56.1 | 56.1 | 56.1 |
| Aluminum stearate | 3.5 | 3.5 | 3.5 | 3.5 | 3.5 |
| Amsco #140 (odorless aliphatic solvent) | 83.0 | 83.0 | 83.0 | 83.0 | 83.0 |
| 24% lead naphthenate drier | 2.6 | 2.6 | 2.6 | 2.6 | 2.6 |
| 6% cobalt naphthenate drier | 1.6 | 1.6 | 1.6 | 1.6 | 1.6 |
| Anti-skinning agent (Exkin #2 oxime antioxidant) | 1.3 | 1.3 | 1.3 | 1.3 | 1.3 |
| Total pounds/100 gallons | 1,217.1 | 1,211.85 | 1,206.6 | 1,196.1 | 1,175.1 |
| Raw material savings per gallon | 0 | $0.03 | $0.05 | $0.10 | $0.19 |
| Opticla data: Contrast ratio (3 mil drawdown) | 0.980 | 0.975 | 0.975 | 0.975 | 0.970 |
| Drying characteristics: | | | | | |
| Set to touch (minutes) | 101 | | 90 | | |
| Tack free (minutes) | 128 | | 115 | | |
| Dry hard, hours | 4 | | 4 | | |
| Full hardness | (1) | | (1) | | |

[1] Overnight.

TABLE VI.—ALKYD FLAT PAINTS [1]—PERFORMANCE DATA

| Percent TiO₂ replacement, volume basis | Control | Sodium alumino silicate | | | |
|---|---|---|---|---|---|
| | 0 | 10 | 20 | 30 | 40 |
| Formulation same as Table V. | | | | | |
| Settling characteristics: | | | | | |
| 1 day | (1) | (1) | (1) | (1) | (1) |
| 17 months [2] | (2) | (2) | (2) | (2) | (2) |
| Enamel holdout, percent | 88.5 | 92.4 | 88.5 | 80.1 | 64.3 |
| Stain removal (number of cycles): | | | | | |
| Pencil | 15 | 17 | 15 | 15 | 12 |
| Crayon | 88 | 92 | 85 | 82 | 88 |
| Scrub resistance (number of cycles): "Ivory" Soap | 1,100 | 1,190 | 1,100 | 1,100 | 1,030 |

[1] None.
[2] Very soft.

The data in this table indicate that at up to 40% replacement, very litle, if any, deterioration of the paint properties occurs.

The viscosity of alkyd resin flat paints and water-emulsion paints has a tendency to increase with time. The effect is more noticeable in the latter and is undesirable because too great an increase in viscosity results in a paint which is unusable without further reduction. However, when the sodium alumino silicate pigments useful in this invention are used to replace up to 40% of titanium dioxide, in general the viscosity stability of the water-emulsion paints is improved and the viscosity stability of the alkyd resin flat paints is maintained.

TABLE VII.—VISCOSITY CHANGE IN PAINTS
[All in Krebs units]

| Parts TiO$_2$ replaced by sodium alumino silicate: | Polyvinyl acetate, 9 months | Butadiene-styrene, 7 months | Acrylic, 6 months | Alkyd resin, 8 days |
|---|---|---|---|---|
| 0 | +21 | +1 | +5 | +3 |
| 5 |  |  |  | +3 |
| 10 |  |  |  | +3 |
| 20 | +10.5 | −2.5 | −1.25 | +2 |
| 30 | +9.5 | −4.4 | −3.5 |  |
| 40 | +5.0 | −3.6 | −3.0 | +4 |

NOTE.—+ means viscosity increase; − means viscosity decrease.

When greater than 40% titanium dioxide is replaced by synthetic sodium alumino silicate pigments, greater viscosity stability results, particularly in latex paints, but the decrease in optical properties is such that it is not desirable to replace more than 40% titanium dioxide.

The use of sodium alumino silicate pigments to partially replace titanium dioxide in alkyl resin flat paints results in exceptional flatting improvements.

TABLE VIII.—EFFECT OF SODIUM ALUMINO SILICATE PIGMENTS ON THE GLOSS OF AN ALKYD RESIN PAINT

|  | Control | Sodoium alumino silicate | | | | |
|---|---|---|---|---|---|---|
| Percent TiO$_2$ replacement, volume basis | 0 | 5 | 10 | 20 | 30 | 40 |
| 60° specular gloss, percent | 85 | 60 | 40 | 20 | 13 | 9 |

The data in Table VIII indicate that replacement of up to 40% titanium dioxide results in a significant increase in flatting of the alkyd resin paint. At more than 40% replacement, the gloss is decreased even more, however, other paint properties are adversely affected at greater than 40% replacement of titanium dioxide.

While I do not intend to be bound by a specific theory, the reasons for the improved optical properties of the paints are that the sodium alumino silicate causes an improved dispersion of the titanium dioxide. The effective aggregate size of the synthetic, amorphous, sodium alumino silicate is 0.2 micron. The titanium dioxide used herein has an aggregate size of 2.0 microns, which is its known most efficient aggregate size in paints. The very large number of relatively small extender pigment aggregates separate the larger titanium dioxide aggregates, thus achieving more efficient dispersion; since the extender appears to coat or condition the titanium dioxide, the tendency of the titanium dioxide to reagglomerate into larger less effective aggregates after removal of dispersion energy is reduced. This results in a better utilization of the high refractive index of titanium dioxide and a more effective use of its optical properties.

The phrase sodium alumino silicate pigment as used herein means a synthetic, finely divided, amorphous material with a mean particle diameter of 0.02 micron and a pH in the range from 6.5 to 10.5. Such materials are described in detail in U.S. Patents 2,739,073 and 2,848,346. These pigments are distinguished from naturally occurring and synthetic zeolites as well as naturally occurring and synthetic molecular sieves.

While the properties of the sodium alumino silicate in both alkyd resin flat paints and latex water-emulsion paints have been given in only a few formulations, it is intended that these examples be representative of the classes of paints described and useful in interior, exterior, and interior-exterior applications which utilize titanium dioxide as a pigment. The sodium alumino silicate incorporates easily in water-emulsion paints and alkyd resin flat paints and is handled like any other wettable pigment.

The term volume replacement is used to mean the replacement of titanium dioxide by a volume equal to that removed from the formulation. For example, a 40% replacement on a volume basis means that 40% by weight or volume of the titanium dioxide has been replaced in the formula by an equal volume of extender pigment.

The term weight replacement is used to indicate that the weight of titanium dioxide removed from the formulation is replaced by an equal weight of extender pigment.

The foregoing is illustrative only and additional modifications may be made without departing from the substance of the invention as defined in the appended claims.

What is claimed is:

1. The method of extending titanium dioxide pigments in water emulsion paints selected from the group consisting of polyvinyl acetate emulsions, styrene-butadiene latexes and emulsions of acrylic ester polymers to produce a dispersion of tiatnium dioxide having greater hiding power as measured by the optical contrast ratio than the paint without said extension of the titanium dioxide by replacing from 10% up to 40% by weight of the titanium dioxide pigment in the paint formulation by a finely divided synthetic, amorphous sodium alumino silicate pigment having an effective aggregate size of 0.2 microns, a mean particle diameter of 0.02 micron and a pH in the range of from 6.5 to 10.5 with 0.8 to 1.3 moles of Na$_2$O per mole of Al$_2$O$_3$ and at least 4 moles of SiO$_2$ per mole of Na$_2$O.

2. The method of claim 1 wherein the dispersion has a hiding power as measured by the optical contrast ratio of at least 0.938/0.957 of the optical contrast ratio of the paint without said extension of the titanium dioxide.

3. The method of extending titanium dioxide pigments in alkyd resin flat paints to product a dispersion of titanium dioxide having a hiding power as measured by the optical contrast ratio of at least 0.97/0.98 of the optical contrast ratio of the paint without said extension of the titanium dioxide by replacing from 5% up to 40% by volume of the titanium dioxide pigment in the paint formulation by a finely divided synthetic, amorphous sodium alumino silicate pigment having an effective aggregate size of 0.2 micron, a mean particle diameter of 0.02 micron and a pH in the range from 6.5 to 10.5 with 0.8 to 1.3 moles of Na$_2$O per mole of Al$_2$O$_3$ and at least 4 moles of SiO$_2$ per mole of Na$_2$O.

References Cited

UNITED STATES PATENTS

| 2,848,346 | 8/1958 | Berforell | 106—288 |
| 2,877,130 | 3/1959 | Caron et al. | |
| 3,037,881 | 6/1962 | McDowell. | |

MURRAY TILLMAN, Primary Examiner

W. J. BRIGGS, SR., Assistant Examiner

U.S. Cl. X.R.

106—300; 260—29.6, 29.7, 33.6, 40, 41, 41.5